(12) United States Patent
Grieb et al.

(10) Patent No.: US 6,205,540 B1
(45) Date of Patent: Mar. 20, 2001

(54) PROCESSOR WITH ENHANCED INSTRUCTION SET

(75) Inventors: Robert Grieb, Medford; David M. McWherter, Jr., Mt. Holly, both of NJ (US)

(73) Assignee: Franklin Electronic Publishers Incorporated, Burlington, NJ (US)

( * ) Notice: Subject to any disclaimer, the term of this patent is extended or adjusted under 35 U.S.C. 154(b) by 0 days.

(21) Appl. No.: 09/100,734

(22) Filed: Jun. 19, 1998

(51) Int. Cl.[7] .................................................. C06F 15/00
(52) U.S. Cl. ........................................................... 712/209
(58) Field of Search ............................................. 712/209

(56) References Cited

U.S. PATENT DOCUMENTS

| | | | |
|---|---|---|---|
| 4,346,437 | 8/1982 | Blahut et al. | 712/205 |
| 5,361,389 | 11/1994 | Fitch | 703/27 |
| 5,408,622 | 4/1995 | Fitch | 703/27 |
| 5,794,010 * | 6/2000 | Worrell et al. | 712/209 |
| 5,881,279 * | 3/1999 | Lin et al. | 712/209 |
| 5,884,071 * | 3/1999 | Kosaraju | 712/209 |
| 5,983,337 * | 11/1999 | Mahalingaiah et al. | 712/32 |
| 6,076,156 * | 6/2000 | Pickett et al. | 712/226 |

* cited by examiner

Primary Examiner—David Y. Eng
(74) Attorney, Agent, or Firm—Reed Smith LLP (57) ABSTRACT

The number of opcode functions exceeds the number of opcodes available by virtue of a technique employing dual function opcodes wherein the second function is executed when a particular resolving flag is put into a set state and otherwise the first function is executed. Furthermore, a generic push opcode and a generic pop opcode are employed without any register pointer designations so that a series of push operations can be performed using a single opcode and a series of pop operations can be performed using a single opcode. The utility of the processor is further enhanced by incorporating a series of handler opcodes that permits simulating on the instruction set of the processor a program designed for a different instruction set. A special simulator opcode called a jump vector opcode is employed to control the operation of reading in the target opcode, applying an algorithm that provides the host processor address for corresponding handler opcodes and jumping to those addresses.

7 Claims, 7 Drawing Sheets

| 0x43 | MOV T,R3 | R3 ← T; RP ← 3 |
|---|---|---|
| 0x53 | MOV R3,T | T ← R3 |
| 0xA5 | MOV24 (T),R5 | T,R5 ← M(T); RP ← 5 |
| 0xAE | MOV24 R6,(T) | M(T) ← R6; RP ← 6; T ← T+2 |
| 0xA7 | MOV24 (T),RP | T,R(RP) ← M(T) |
| 0xAF | MOV24 RP,(T) | M(T) ← R(RP); T ← T+2 |
| 0x62 | MOV T,SP | SP ← T |
| 0x6B | MOV ST,T | T ← ST |
| 0x7C | RPTR 12 | RP ← 12 |
| 0x6E | RBNK 0 | RB ← 0 |
| 0x20 | ADD RP | MP,T ← T+R(RP) |
| 0x16 | SUB RP | T ← T-R(RP) |
| 0x1E | XOR | T ← T XOR R(RP) |
| 0x21 | INC RP | T,R(RP) ← R(RP)+1 |
| 0xB0 | BRA | PC ← PC+1+T |
| 0xB7 | BEQ | If Z Then PC ← PC+1+T |
| 0x38 | JMP (T) | PC ← T; RP ← 8 |
| 0x68 | JSR (T) | PC ← T; SP ← SP-1; M(SP) ← (Return Address); RP ← 8 |
| 0x39 | RTS | PC ← M(SP); SP ← SP+2; RP ← 0; T ← R0 |
| 0xBC | PUSH R4 | SP ← SP-1; M(SP) ← R4 |
| 0xBF | PUSH RP | SP ← SP-1; M(SP) ← R(RP); RP ← RP+1 |
| 0xB0 | POP R0 | R0,T ← M(SP); SP ← SP+1 |
| 0xB7 | POP RP | R(RP),T ← M(SP); SP ← SP+1; RP ← RP-1 |

PROCESSOR WITH ENHANCED INSTRUCTION SET

FIELD OF THE INVENTION

This invention relates to an electronic computer processor. In particular, this invention relates to a processor having enhanced instruction set features.

BACKGROUND

In most processors, the number of available opcodes is limited by the length of the binary word which can be fetched into the instruction register. For instruction registers with a word length of N bits, $2^N$ different opcodes can be read by the processor. Thus an 8 bit opcode set is limited to 256 opcodes. Encoding register designations within the opcodes, requires multiple opcodes for each register operation, leaving fewer opcodes available to encode other operations.

It is a goal of processor design to minimize the amount of time spent fetching data for operations, while keeping a maximum number of opcodes available for instructions.

One known technique is to increase the number of available opcodes by reading two consecutive words from the bus and joining them to form a single opcode. This technique effectively squares the number of available opcodes. But the reading of two words for every opcode slows the operation of the processor.

An alternative technique, disclosed in U.S. Pat. No. 4,346,437 of Blahut et al. and employed in the RCA-CDP1804AC processor, encodes some instructions with a one-word opcode and other instructions with a two-word opcode. Still, processor time is lost reading two opcode words for some of the instructions.

To avoid the proliferation of opcodes for register operations, the RCA-CDP1804AC microprocessor employs a single opcode independent of the register operated on for certain input/output (I/O) and arithmetic logic unit (ALU) instructions. The particular register on which an operation is performed is determined by a 4-bit "X" designator stored in the microprocessor. The value of the X designator is set by the instruction "SET X", which copies the contents of the N register to the X designator. Thus, the X designator enables a single opcode to encode an operation on any register designated by X; however, each time it is necessary to change the value of the X designator, a SET X instruction must be executed, which results in a loss of processor time.

Because operations are frequently performed on data registers, it is desirable for certain instructions to employ a single opcode for every possible combination of instruction and register. This is performed in the RCA-CDP1804AC microprocessor with the use of an "N" register. For each 8-bit opcode fetched by the CDPI804AC, the lower-order 4 bits of the instruction are loaded into the N register, and the value in the N register is used to designate the register operated on by the instruction.

There are processors with differing instruction sets and varying levels of performance. Programs are generally written for a particular processor and often cannot be run on any other processor. However, the development of most application programs requires a large investment of time and money. It is desirable to minimize those development costs should one wish to run a program on an alternative processor different from the one for which the program was designed. These costs of developing new programs can be reduced if the alternative processor is capable of interpreting and executing programs written for the original processor.

In particular, as a result of the popularity and endurance of the 6502 and related processors, a great number of programs have been written employing the 6502 instruction set. With the advance of technology, more sophisticated processors have been developed. It is beneficial, however, to maintain the ability to execute the vast library of programs written for the 6502 processor on a more advanced processor.

A "source" program which has been written for one processor may be executed on an alternative "host" processor with the use of a dispatch loop. A dispatch loop first fetches an opcode of the source program. From a table stored in memory, the dispatch loop then determines the address of a simulation routine consisting of host processor instructions which simulate the actions called for by the source instruction. The host processor jumps to the address of the simulation routine, executes the routine, and returns to the dispatch loop to fetch the next instruction. This technique, while offering accurate and flexible emulation, is particularly slow, in part due to the "overhead" of instructions which must be executed in order to operate the dispatch loop but which do not themselves simulate the source program.

It is known how to overcome the speed problems of the dispatch loop with the use of additional computer hardware componentry, as disclosed in U.S. Pat. Nos. 5,361,389 and 5,408,622, both of Jonathan Fitch. This solution, while improving the speed of emulation, results in a significant increase in hardware complexity, thus contravening the design of a compact computer system at a low cost.

Figure 1:
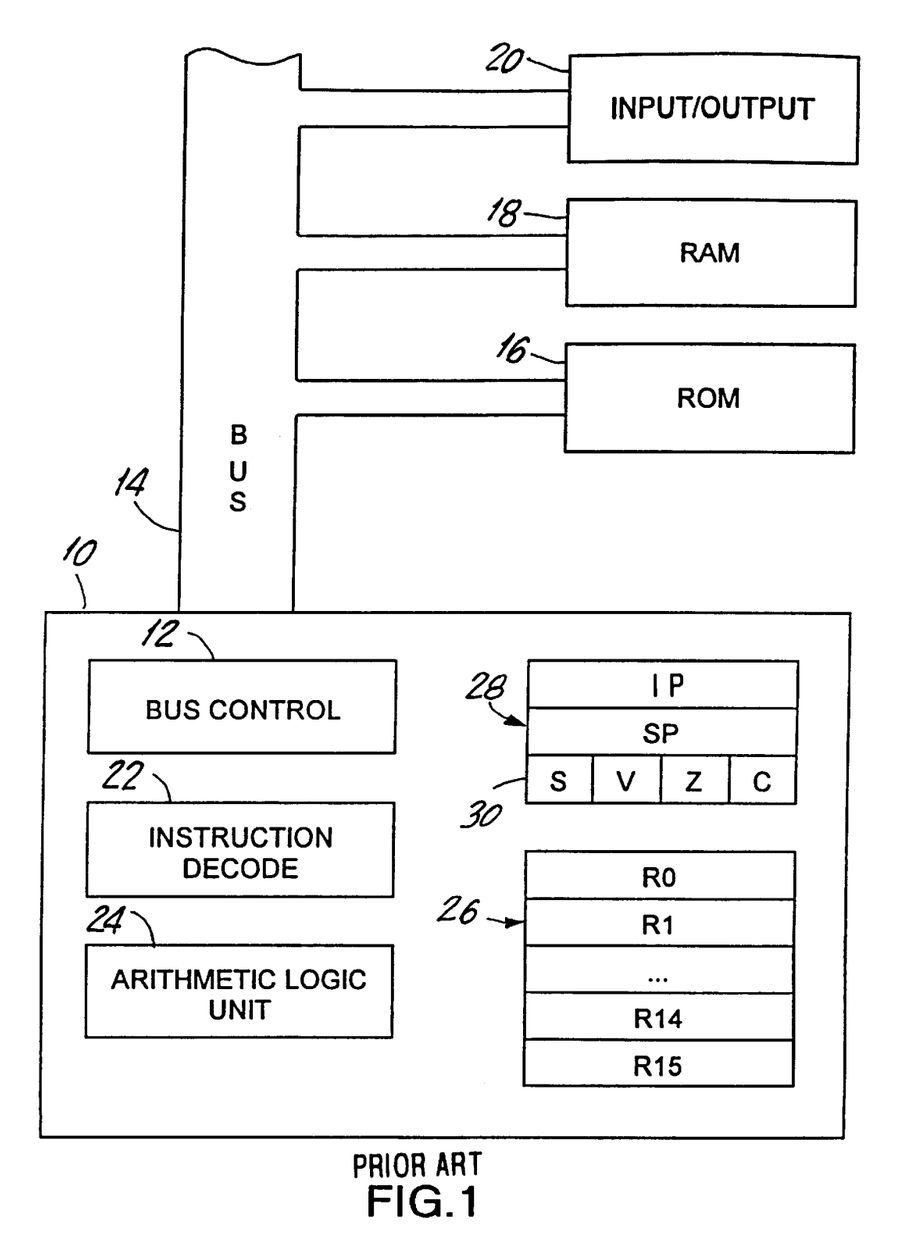
FIG. 1 is a block diagram of a computer including a processor according to the prior art.

Prior Art Processor—(FIG. 1)

As shown in FIG. 1, in a known computer design, a bus control 12 controls the flow of data, instructions, and addresses between processor 10 and a bus 14. Bus 14 enables communication between components of a computer, including processor 10, read-only memory (ROM) 16, random-access memory (RAM) 18, and input and output devices 20. Routines which direct the operation of processor 10 are stored as series of opcodes in ROM 16 and/or RAM 18. To execute these routines, processor 10 fetches an opcode by sending a memory address over bus 14 to specify a memory location in either ROM 16 or RAM 18. The opcode word at the addressed memory location is then sent over bus 14 to processor 10. An opcode is typically 8 bits, in which case the number of opcodes is limited to 256.

Opcodes fetched from bus 14 are interpreted by an instruction decode unit 22, which determines the operation or operations specified by the opcode. An arithmetic logic unit 24 then carries out the instructions on data contained in registers 26. A set of special purpose registers 28 is also provided, including an instruction pointer IP and a stack pointer SP. Instruction pointer IP supplies the address of the next opcode to be fetched from memory 16, 18 and is incremented (to point to the next opcode) each time an opcode is fetched. Flags 30, including sign flag S, overflow flag V, zero flag Z, and carry flag C are tested in conditional operations.

OBJECTS OF THE INVENTION

It is an object of the invention to provide a processor capable of executing a number of instructions greater than the number of the opcode set.

It is another object of the invention to provide a processor capable of executing a program coded for a different processor. In particular, it is an object of the invention to provide such a processor which operates without the need for a dispatch loop or for additional emulation hardware.

It is a related object of this invention to provide the above objects in a mode that optimizes use of memory capacity and does so at a speed of operation acceptable to the user.

BRIEF DESCRIPTION

In brief, a first feature of this invention increases the number of instructions available from the set of opcodes available. For example, an eight bit opcode size provides 256 opcodes. This invention uses those 256 opcodes to provide more than 256 instructions. Where it is known that a particular pair of instructions (paired instructions) will always appear in sequence, then the second of the two opcodes is used to provide two instructions or functions. When this dual function opcode is fetched, it normally performs a first function. However, if it is to perform its second function, the program calls for first setting a resolving flag to a set state. This setting operation is one of the responses to the execution of the immediately prior one of the paired instructions. As long as the function of the immediately prior opcode never precedes the first function of the dual function opcode, this setting of the resolving flag can be built into the processor.

With the resolving flag in its set state, the fetching of the dual function opcode results in executing the second operation of the dual function opcode. The setting flag is then immediately cleared so that if the next opcode fetched is a dual function opcode, it will execute its first operation. In this fashion, the number of functions or operations performed by a predetermined number of opcodes can be greater than the predetermined number of opcodes.

A second feature of this invention also provides for an increase in opcode functionality; that is, providing more opcode instructions than there are opcodes. The feature is associated with the pushing or popping of data between a stack and a set of registers. The push opcode and the pop opcode are each provided as a generic opcode; that is without any designation of the register from which or to which data is to be copied.

When the generic push opcode is fetched, the processor immediately decrements the stack pointer and copies the data from whatever register is currently pointed to by the register pointer into the stack and then increments the register pointer. Repeated fetching of the push opcode will repeat the sequence as often as required to copy the set of data from a sequence of registers into the stack.

Similarly with respect to the pop opcode, a single generic pop opcode is encoded. When it is fetched, it causes data from the stack to be copied to the register currently designated by the register pointer. The processor then immediately increments both the stack pointer and decrements the register pointer. Thus a series of steps fetching the generic pop opcode will result in copying a series of separate items of data from the stack to a sequence of registers.

In both cases, the register pointer is initialized prior to the first fetch of a sequence of generic push opcodes or a sequence of generic pop opcodes.

A further aspect of this invention which provides for efficient versatility is one that permits a program designed for a particular instruction set to be executed in a host processor designed for a different instruction set. For example, a program for a first instruction set might exist on a card that can be read by a host processor designed to operate with a different instruction set.

The host processor has in memory a set of opcodes which perform the operations, in the host processor, that would be called for by the opcodes in the target program on the card.

These host opcodes are in an allocated set of separate addresses. When the target program from the card is to be read into the host processor, a first step is to detect the card and set a simulation flag. When the simulation flag is set, adjustments that may be required are made such as sizing the registers and establishing the flags needed for the simulation mode. Most importantly, a predetermined algorithm is enabled. The pointer for the card opcodes is initialized. A particular simulator opcode (called a jump vector JMPV opcode herein) is generated by the host processor to fetch opcodes from the card (target opcodes), to increment the pointer for the card opcodes, and to apply the algorithm to the target opcode to create a memory address in the host processor.

This algorithm generated host memory address is the first of a subset of host memory addresses that constitutes a handler that performs the target opcode function. Thus a sequence of host processor memory locations may have to be addressed for each target opcode. The simulator opcodes are fetched from the host memory addresses and executed to perform the operation that would have been performed by the corresponding target opcode on the card if the latter were executed in a processor having the instruction set appropriate for the card opcodes.

The JMPV opcode is fetched from the last one of the set of host memory addresses associated with a single target opcode. The JMPV opcode repeats the operation of fetching the next target opcode from the card, incrementing the register pointer for the target program, applying the addressing algorithm and fetching handler opcodes. This JMPV opcode function replaces and thus eliminates the prior art dispatch loop.

BASIC CONTENTS

Figure 2:
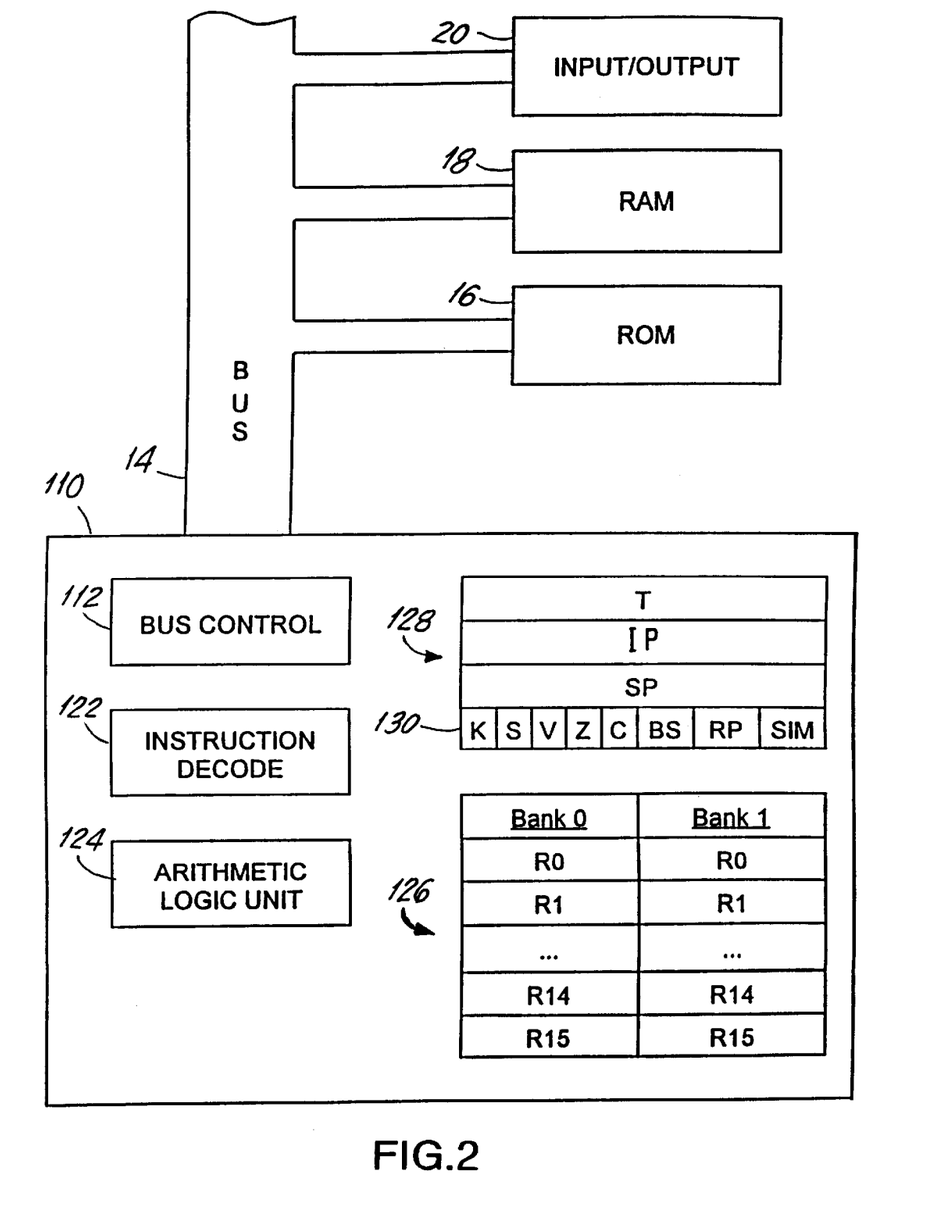
FIG. 2 is a block diagram of a computer including a processor in accordance with the present invention.

As shown in FIG. 2, a bus control 112 controls the flow of data, instructions, and addresses between processor 110 and a bus 14. Bus 14 provides communication between processor 110 and components of a computer as in the prior art (FIG. 1). The stack is incorporated in the RAM 18. Opcodes fetched by processor 110 through bus 14 are interpreted by instruction decode unit 122, which determines the operation or operations specified by the opcode. Arithmetic logic unit 124 then carries out the instructions on data contained in registers 126. Special purpose registers 128 are also provided. An instruction pointer IP, a stack pointer SP and a temporary register T are provided. The set of flags 130 includes sign flag S, overflow flag V, zero flag Z, and carry flag C for use in conditional operations. Additional flags K and BS are provided, and four further flag bits are designated as RP. Flag functions are described below.

Opcodes for operations to be performed on one of the general purpose registers 126 may or may not be encoded with a designation of the specific register on which an operation is to be performed. In processor 110, when the register designation is not encoded in the opcode, the register is designated with the use of the BS and RP flags. As illustrated in FIG. 2, the thirty-two general purpose registers 126 of processor 110 are separated into two sixteen-register banks, "Bank 0" and "Bank 1". Operations performed on registers 126 can be performed only on one or the other of the register banks. The bank that can be operated on is designated by the value of the one-bit bank select flag BS, so that when BS contains "0", a register from Bank 0 is operated on, and when BS contains "1", a register from Bank 1 is operated on. The specific register is then selected from among the sixteen registers in the designated bank by the four-bit register pointer RP. Thus, when BS contains "0" and RP contains hexadecimal "C," register R12 of Bank 0 is selected.

Figure 3:
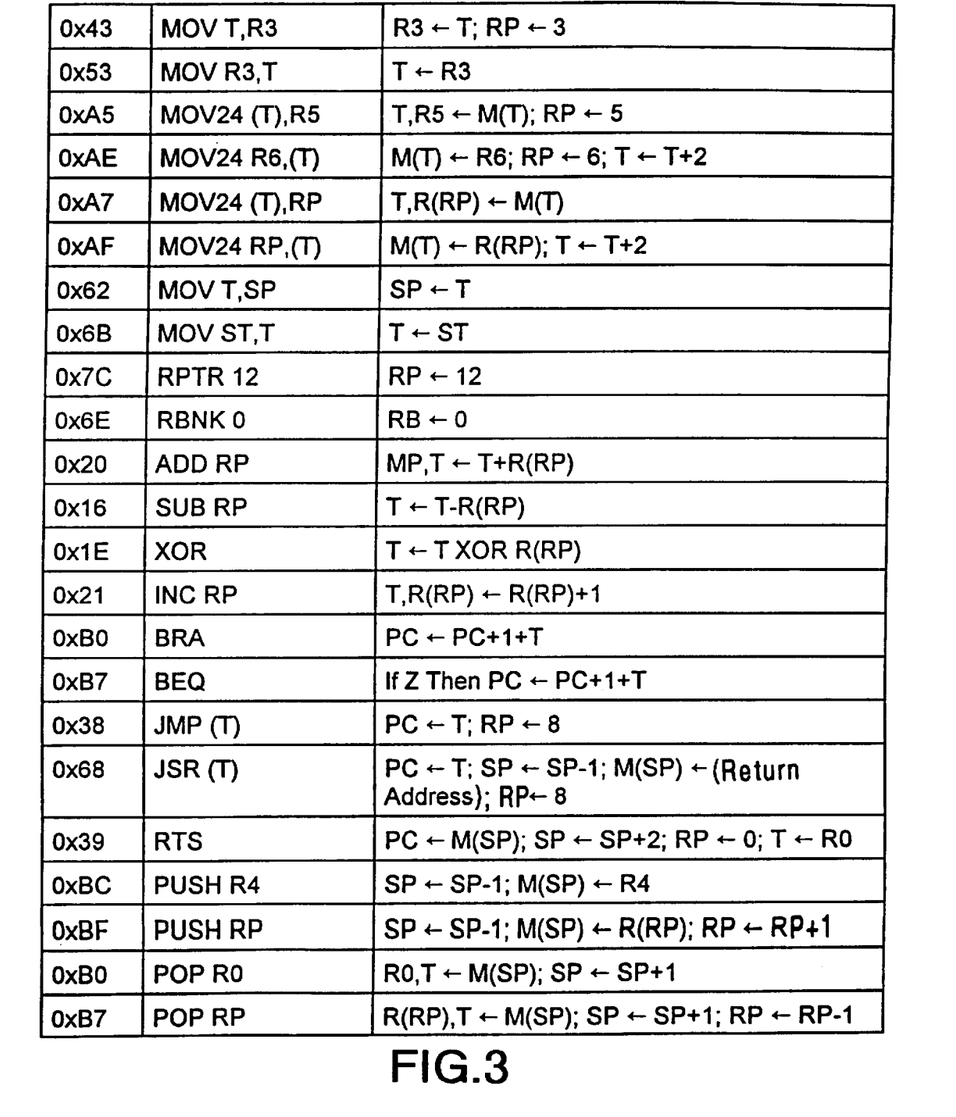
FIG. 3 is a table illustrating opcodes, instructions, and processor operations according to the present invention.

Certain operations performed by ALU 124 are illustrated in FIG. 3 with the use of an arrow notation. ALU 124 evaluates the expression to the right of the arrow and places the results in the location specified to the left of the arrow. When a result is placed in more than one location, all of the locations are listed to the left of the arrow and separated by commas. Multiple steps in an operation are separated by semicolons, with the leftmost steps being performed first. The expression "M(x)" is used to designate a memory location with address x, accessed from RAM or ROM by processor 110 through bus 14. For example, M(T) signifies the memory location whose address is designated by the contents of register T. The expression "R(RP)" signifies the general purpose register designated by the contents of RP. Whenever a register is designated, e.g., by "R5" or "R(RP)," it is understood that the operation is performed on the register bank specified in flag BS.

An exemplary partial set of opcodes executed by processor 110 is illustrated in FIG. 3. Each opcode is illustrated (in hexadecimal notation) with a unique instruction and an operation performed by processor 110. When an assembly program is assembled into an executable program, a line of assembly code (second column of FIG. 3) is encoded by an opcode (first column of FIG. 3). When processor 110 executes the executable program, the opcode is fetched over bus 14 by bus control 112 and decoded by instruction decode unit 122, which determines the operation (third column of FIG. 3) to be performed by arithmetic logic unit 124.

To simplify the description, opcodes are at times described herein as performing an operation, such as adding or moving. It is the processor which performs such operations. The fetching of a particular opcode directs the processor to perform the operations.

Most programs spend most of their time moving data. Thus, a variety of opcodes encoding different MOV instructions has been provided for specific applications. In some cases, it is preferable to encode a specific register number in the opcode of the selected MOV instruction. In other cases, it is preferable to use register pointer RP to designate a particular register. In the case of processor 110, register numbers are specifically encoded in the opcode for MOV instructions which operate on registers R0 through R6. MOV instructions performed on any registers, including R0 through R6 as well as R7 through R15, can be performed by designating the register with register pointer RP.

Processor 110 thus avoids the monopolization of available opcodes that would take place if a register number were encoded in each opcode. A single opcode in processor 110 can be used to encode operations on a variety of registers. Register pointer RP may be set with an opcode 0x7C "RPTR 12", which sets register pointer RP to point to register R12. Each RPTR instruction is provided with a unique opcode. Thus, opcode 0x7C sets RP to 12, 0x7D sets RP to 13, and so on. In executing opcode 0xA7, which encodes the instruction "MOV24 (T),RP", processor 110 moves twenty-four bits of data stored at the memory location addressed by register T (and fetched over bus 14 from RAM or ROM) into whichever register is pointed to by RP. Opcode 0x20 "ADD RP" adds the contents of register T to whichever register is pointed to by RP. Opcode 0x21 "INC RP" increments the contents of whichever register is pointed to by RP. These three exemplary opcodes alone substitute for forty-eight different opcodes that would have been required if the register number for each of registers R0–R15 were encoded in the opcode.

The parsimony of opcodes is not bought, however, at the price of slowing down execution by continually resetting register pointer RP with different values. Processor 110 automatically resets RP upon execution of several of the opcodes. In particular, processor 110 automatically sets RP to point to a register into which data is moved. For example, opcode 0x43 "MOV T,R3" in addition to performing the standard operation of moving the contents of register T into register R3, sets RP to point to register R3.

Opcode 0x68, which encodes the JSR subroutine jump instruction, performs the conventional operations of resetting program counter PC to a target address from register T and writing a return address to the stack pointed to by stack pointer SP. The return address is preferably the address of the opcode which follows the delay slot of the 0x68 JSR opcode. In addition to the conventional operations, opcode 0x68 automatically sets register pointer RP to point to register R8. This enables the subroutine called by JSR opcode 0x68 to preserve the registers, beginning with R8, that the subroutine intends to use during processing but must be restored prior to returning to the calling routine. Since RP is already set to R8, the entry code, or preamble, of the subroutine need only execute one generic push opcode for each such register the subroutine will use during processing. Prior to exiting, the subroutine restores the preserved registers and returns using an RTS to the calling routine. In addition, RTS opcode 0x39 automatically resets RP to point to register R0 so that the calling routine can quickly retrieve any returned values from the called routine.

The Generic Push and Pop Opcodes

PUSH and POP instructions are stack instructions which are commonly used to move data between the registers and the stack. Opcode 0xBC, for example, encodes the instruction "PUSH R4", which pushes the contents of register R4 onto the stack. Similarly, opcode 0xB8 pushes R0, 0xB9 pushes R1, and so on. Rather than encoding a register number in each of the opcodes, the register number is encoded in PUSH instructions only for registers R0 through R6 (opcodes 0xB8 through 0xBE). A single opcode 0xBF "PUSH RP" is available as a generic opcode to push whichever register is pointed to by RP. In addition to performing the push operation, opcode 0xBF decrements the stack pointer prior to the push operation and increments the register pointer after the push operation. The three lowest bits of the (four-bit) register pointer are incremented by one.

A POP instruction is used to move data from the stack to a register. As with the PUSH instruction, opcodes are provided which encode the POP instructions for R0 through R6 (opcodes 0xB0 to 0xB6, respectively). Opcode 0xB7 is used as a generic opcode to pop data from the stack to whichever register is pointed to by RP. In addition to performing the pop operation, opcode 0xB7 decrements the register pointer and increments the stack pointer. The three lowest bits of the register pointer are decremented by one.

The automatic incrementing of the register pointer with PUSH instructions and the automatic decrementing of the register pointer with POP instructions enables the rapid transfer of a series of data between the registers and the stack. For example, to push registers R8 through R13 onto the stack, the following sequence of instructions can be used:

RPTR 8; set the register pointer to 8
PUSH RP; push R8 onto the stack, set RP to 9
PUSH RP; push R9 onto the stack, set RP to 10
PUSH RP; push R10 onto the stack, set RP to 11
PUSH RP; push R11 onto the stack, set RP to 12
PUSH RP; push R12 onto the stack, set RP to 13
PUSH RP; push R13 onto the stack, set RP to 14

Because the register pointer is set automatically with each PUSH instruction, it is not necessary to reset the pointer with a separate RPTR instruction before each PUSH instruction, which would nearly double the number of instructions, nor is it necessary to employ a separate opcode encoding a push instruction for each of registers R8–R13, which would monopolize opcode values. Copying the stack data back into the respective registers is just as straightforward:

RPTR 13; set the register pointer to 13
POP RP; pop data from the stack to R13, set RP to 12
POP RP; a pop data from the stack to R12, set RP to 11
POP RP; pop data from the stack to R11, set RP to 10
POP RP; pop data from the stack to R10, set RP to 9
POP RP; pop data from the stack to R9, set RP to 8
POP RP; pop data from the stack to R8, set RP to 15

Background For Context-Sensitive Decode

In processor 110, jump instructions (such as 0x38 and 0x68, FIG. 3) and branch instructions (such as 0xB0) set the program counter PC to the value stored in the register T, thus causing program execution to continue with the opcode stored at the memory location designated by the T register. The T register is thus employed as a target-address register for jump and branch instructions. In order to set the target register for a jump or branch, the T register is loaded with data representing the target address using a LDT, or "load-T" instruction. LDT is represented by any one of the opcodes 0xC0 through 0xFF, or in binary, 11000000 through 11111111. The two high bits "11" designate the opcode as a LDT opcode, and the six low bits convey a six-bit data word which is loaded into register T.

The K Flag

Processor 110 employs a flag K, which stores a flag value of either "set" or "cleared". The value stored in the K flag is changed by the opcodes fetched by processor 110. Preferably, the K flag is set and cleared by instruction decode unit 122. One group of "setting" opcodes is associated with the "set" value, while another group of "clearing" opcodes is associated with the "cleared" value. Each time processor 110 fetches a setting opcode, the K flag is set, and each time processor 110 fetches a clearing opcode, the K flag is cleared. Some opcodes may neither set nor clear the K flag, leaving the value thereof unchanged.

Dual Function Opcodes

Some opcodes used by processor 110 are associated with more than one operation. Processor 110, upon fetching a dual function opcode, determines which of these operations it is to perform by checking the value of the K flag. One of the possible operations is associated with the "set" state of the K flag, and another of the possible operations is associated with the "cleared" state of the K flag. Upon fetching of a dual function opcode, the instruction decode unit 122 selects the operation associated with the present state of the K flag. The K flag thus serves as a resolving flag by selecting which operation is to be performed by an overloaded opcode. In this technique of "context-sensitive decoding," the instruction set of processor 110 is expanded beyond the number of available opcodes by assigning more than one processor operation to several of the opcodes.

The group of opcodes which set the K flag is preferably the group of opcodes encoding LDT (load-T) operations, while the group of opcodes which clear the K flag comprises nearly all other opcodes. Thus, the K flag is set each time an LDT opcode is executed and cleared each time any opcode other than an LDT opcode is executed.

As discussed above, the T register stores the target address for branch instructions. Thus, it is in general desirable for a LDT instruction, which sets the value of T, to immediately precede a branch instruction, which makes use of the value of T. This common pairing of an LDT instruction with a branch instruction allows branch instructions to be associated with the dual function opcodes. That is, each opcode which encodes a branch instruction also encodes an alternative instruction. The operation which is performed when such an opcode is fetched is determined by the value of the K flag. If the preceding opcode was a LDT opcode, the K flag has the "set" value and a branch operation is performed; if the preceding opcode was not a LDT opcode, the K flag has the "cleared" value and the alternative operation is performed.

For example, as seen in FIG. 3, the dual function opcode 0xB0 encodes the branch instruction "BRA" as well as the stack instruction "POP R0". When the 0xB0 opcode is fetched, processor 110 tests the value of the K flag. If K is set, "BRA" is executed, and if K is cleared, "POP R0" is executed. Preferably, each of the branch instructions shares an opcode with a stack instruction.

Some amount of care must be used when writing programs to be executed on processor 110. For example, an unsuspecting programmer may write a sequence of instructions in assembly such as the following:

LDT 31
MOV T, R4
BRA

To a person reading this code, it is evident that the programmer wants to load the value "31" into the T register, to copy that "31" to the R4 register, and then to branch to an offset address of "31". A simple compiler program, however, converting these instructions into machine language for execution on a computer system, would replace each of the instructions with its associated opcode, resulting in a series of opcodes such as the following:

0xFF
0x44
0xB0

Processor 110, executing the opcodes, would fetch "0×FF" and perform the "LDT 31" operation as intended. Being a LDT instruction, 0×FF also sets the K flag. The 0×44 opcode is fetched, and "31" is copied to register R4 as intended, but the K flag is cleared since 0×44 is not a load-T instruction. When processor 110 fetches dual function opcode 0×B0, it tests the value of the K flag, finds that it is cleared, and performs a stack operation, rather than the intended branch operation. Thus, instead of performing the operations written by the unwary programmer, processor 110 performs the operations corresponding to a different piece of code:

LDT 31
MOV T, R4
POP R0

Although care must be taken to ensure that each branch instruction is immediately preceded by a load-T instruction, this restriction on program structure has been found to be minimal in comparison to the advantages of increasing the number of available processor operations using a given number of opcodes. Of course, a compiler program which compiles code for execution on processor 110 may include functionality to warn a programmer of code that can be misinterpreted, or even automatically to rearrange the code to perform the functions desired by the programmer.

It should again be noted that a few opcodes may themselves neither set nor clear the K flag. In particular, opcodes which explicitly set or clear the flags in the flag register ST do not necessarily change the K flag, although the K flag, being one of the bits of ST, may be set or cleared by such opcodes if a programmer so desires. Such opcodes encode instructions such as "MOV T, ST", "SETF T" (which uses T to set bits in ST), and "CLRF T" (which uses T to clear bits in ST). The opcode corresponding to the RTI "return from interrupt" instruction restores the K flag to its value before the interrupt.

Effect Of K Flag On LDT

The T register is generally 24 bits in length, and thus may accept up to four six-bit words loaded through LDT. All of the LDT opcodes 0×C0 through 0×FF are setting opcodes. When processor 110 executes an LDT opcode, it is first determined whether the K flag is set, i.e., whether the previous opcode was an LDT opcode. If flag K is not in a set state, indicating that the previous opcode was not an LDT opcode, the six-bit data word is simply copied into register T, and register T is sign extended. On the other hand, if flag K is in a set state, indicating that the previous instruction was an LDT opcode, the contents of register T are shifted by six bits to make room for the six-bit data word before the data word is copied to the low six bits of register T.

Figure 4:
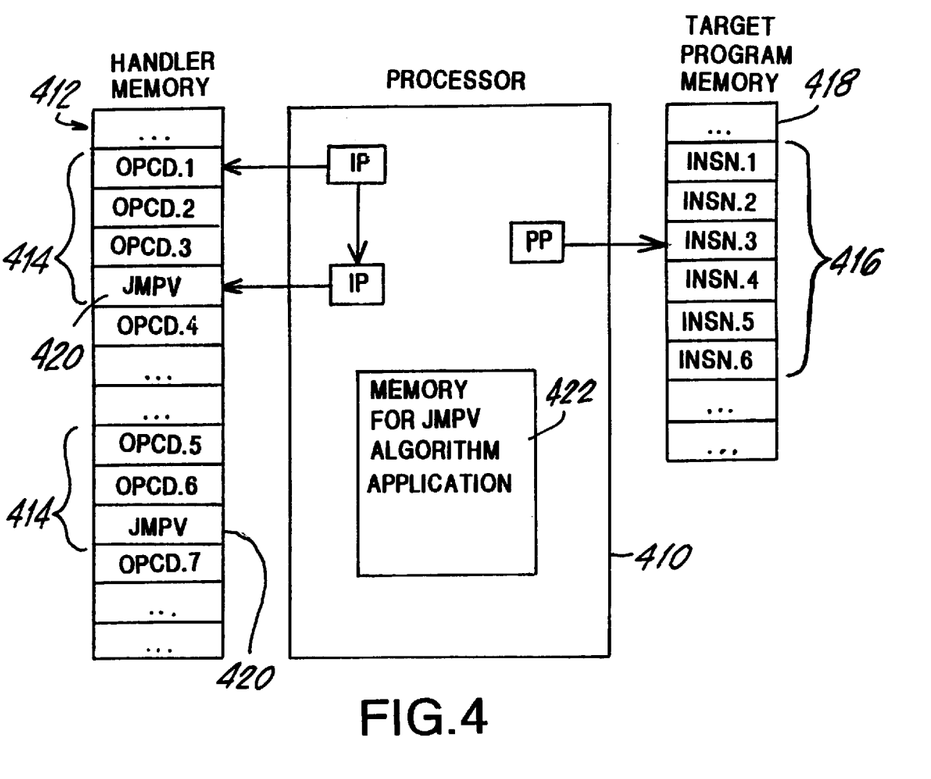
FIG. 4 is a schematic block diagram illustrating the operation of a processor in emulation mode in accordance with the present invention.

The JMPV Vector Opcode and Simulation—(FIG. 4)

One embodiment of this invention has been used to execute in a host processor a target 6502 program that is contained on a card. Each opcode on the card is a target opcode. The host processor 410 has in memory 412 a set of opcodes 414 which when appropriately fetched will perform the functions that would be commanded by the set of target opcodes 416 in the program 418 on the card coupled to the host processor. This handler memory 412 contains not only the set of handler opcodes 414 but also an opcode that is called herein a jump vector (JMPV) opcode 420. This jump vector opcode 420 is the simulation opcode that is at the heart of this simulation arrangement.

When the card containing the 6502 program is coupled to the host processor 410, a simulation flag 140 (see FIG. 2) is set. This simulation flag 140 may make certain adjustments that are a function of the relationship between the host processor 410 design and the design appropriate to the 6502 program. These adjustments could include the sizing of registers and establishing the flags needed for the simulation mode.

The coupling of the card to the host processor also results in fetching the jump vector (JMPV) opcode 420. The processor 410 is designed so that the fetching of this JMPV opcode 420 results in the following three steps:

1. The target opcode designated by the program pointer PP is copied into temporary processor associated memory 422.
2. The emulation pointer PP is incremented by one, and
3. A predetermined algorithm in the processor is applied to the value of the particular target opcode that has been placed in temporary memory to provide an appropriate address.

In one embodiment, this algorithm involves a shift of the binary opcode by a predetermined number of digits and the addition of an offset. The result is an instruction pointer IP for the handler memory 412 to access to the first of the handler memory opcodes that perform the function of the target opcode. The particular handler memory opcode is normally only the first of a subset of host handler memory opcodes that are accessed to perform the target opcode function. This is because the simulation function often requires two or more opcodes for execution by the host processor. The required handler opcodes are fetched from memory 412 and executed to perform the operation that would have been performed by the corresponding target opcode if the target opcode was executed on a processor designed for the 6502 processing function.

For example, the instruction pointer IP may increment from opcode OPCD1 through OPCD3 to provide the function of the target opcode INSN3. The IP continues to fetch handler memory opcodes until a JMPV opcode is fetched from handler memory. Thus, the last of the subset of handler memory opcodes in the subset accessed and fetched for the particular target opcode is the JMPV opcode. The JMPV opcode then causes the processor to repeat the function described above in which the now incremented program pointer PP fetches the next opcode from the 6502 program on the card and causes the sequence of functions set forth above to be repeated to provide the next IP address for the next subset of handler memory opcodes.

SUMMARY

Figure 5:
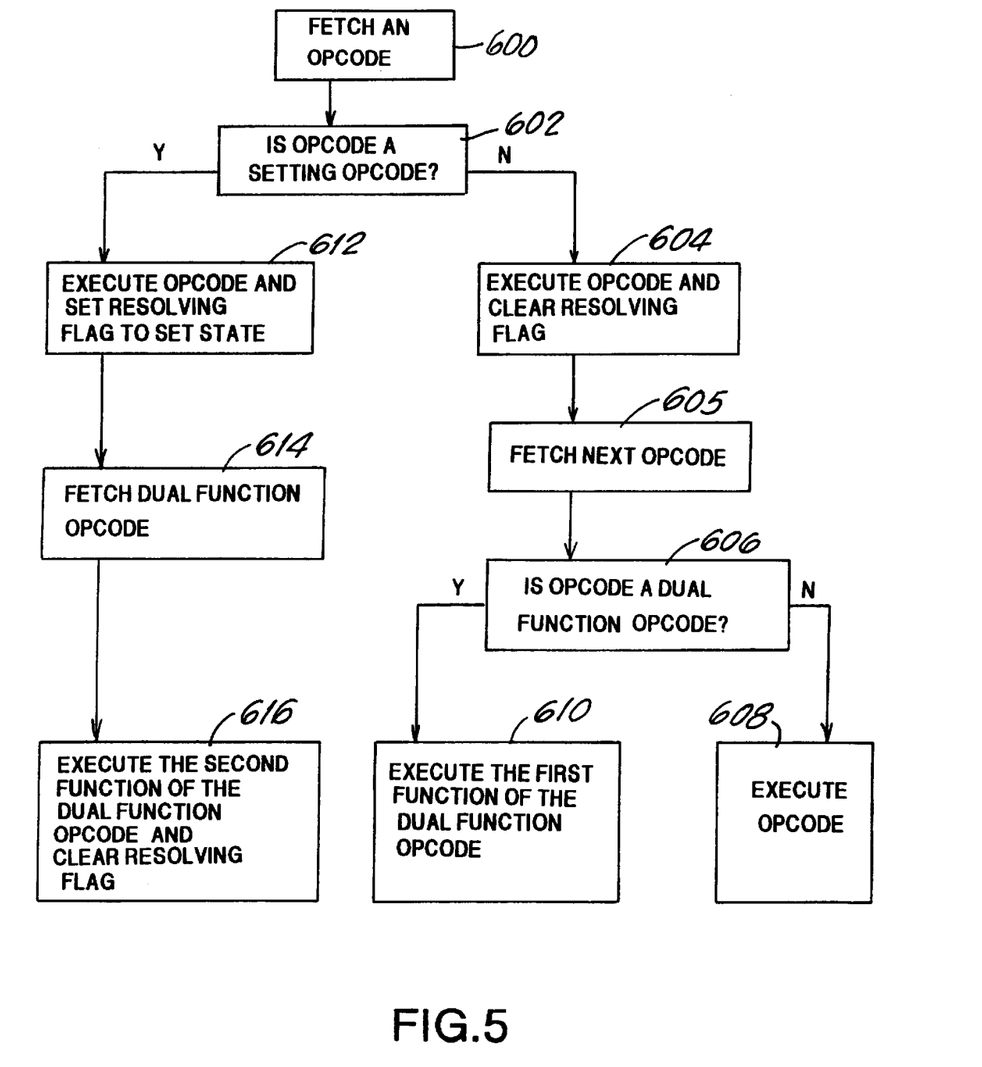
FIG. 5 is a simplified flow chart illustrating a technique whereby a single opcode is used to selectively perform two operations, which operations need not be related to one another.
Figure 6:
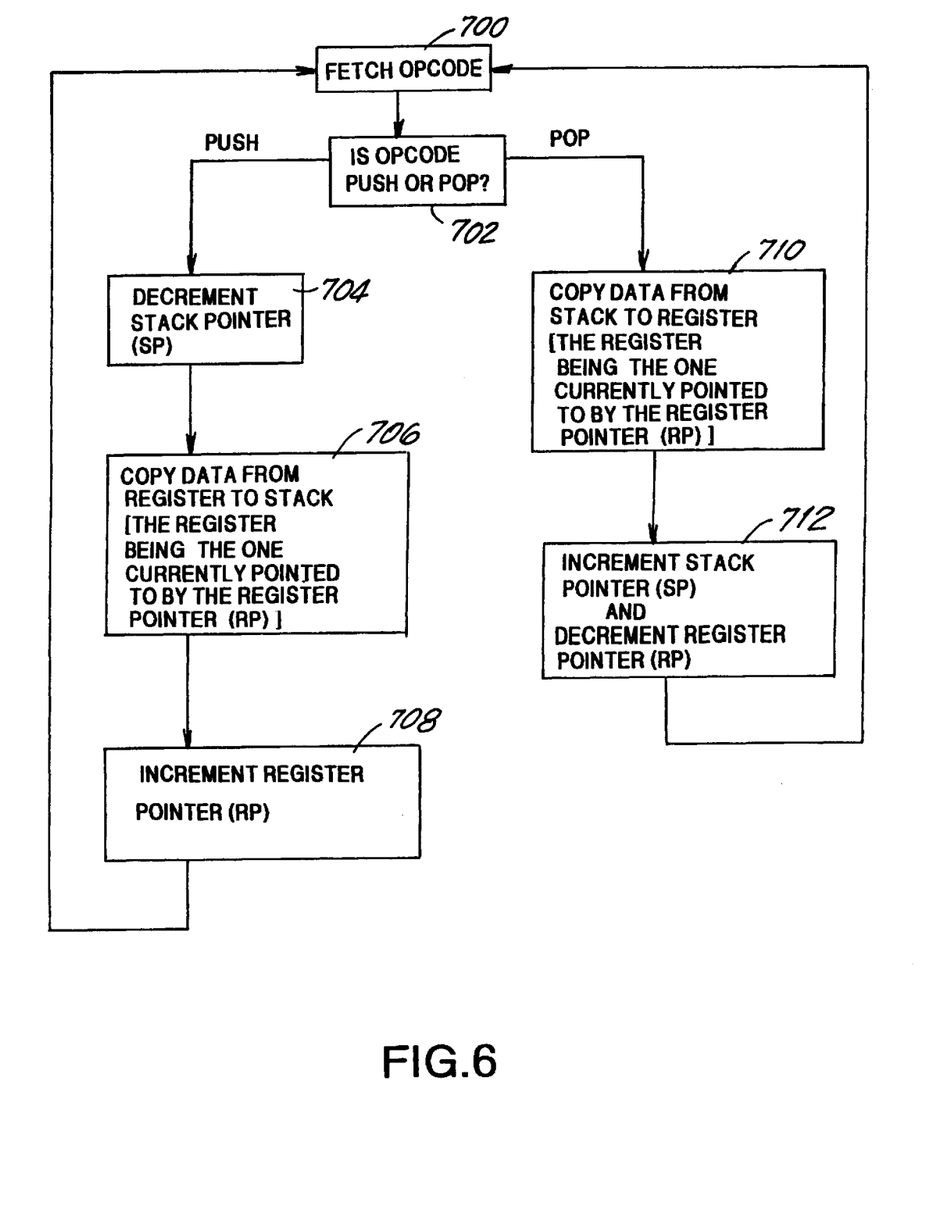
FIG. 6 is a simplified flow chart illustrating a technique whereby a single generic push opcode and a single generic pop opcode can be used to perform the operation of transferring a set of data between a stack and set of registers.
Figure 7:
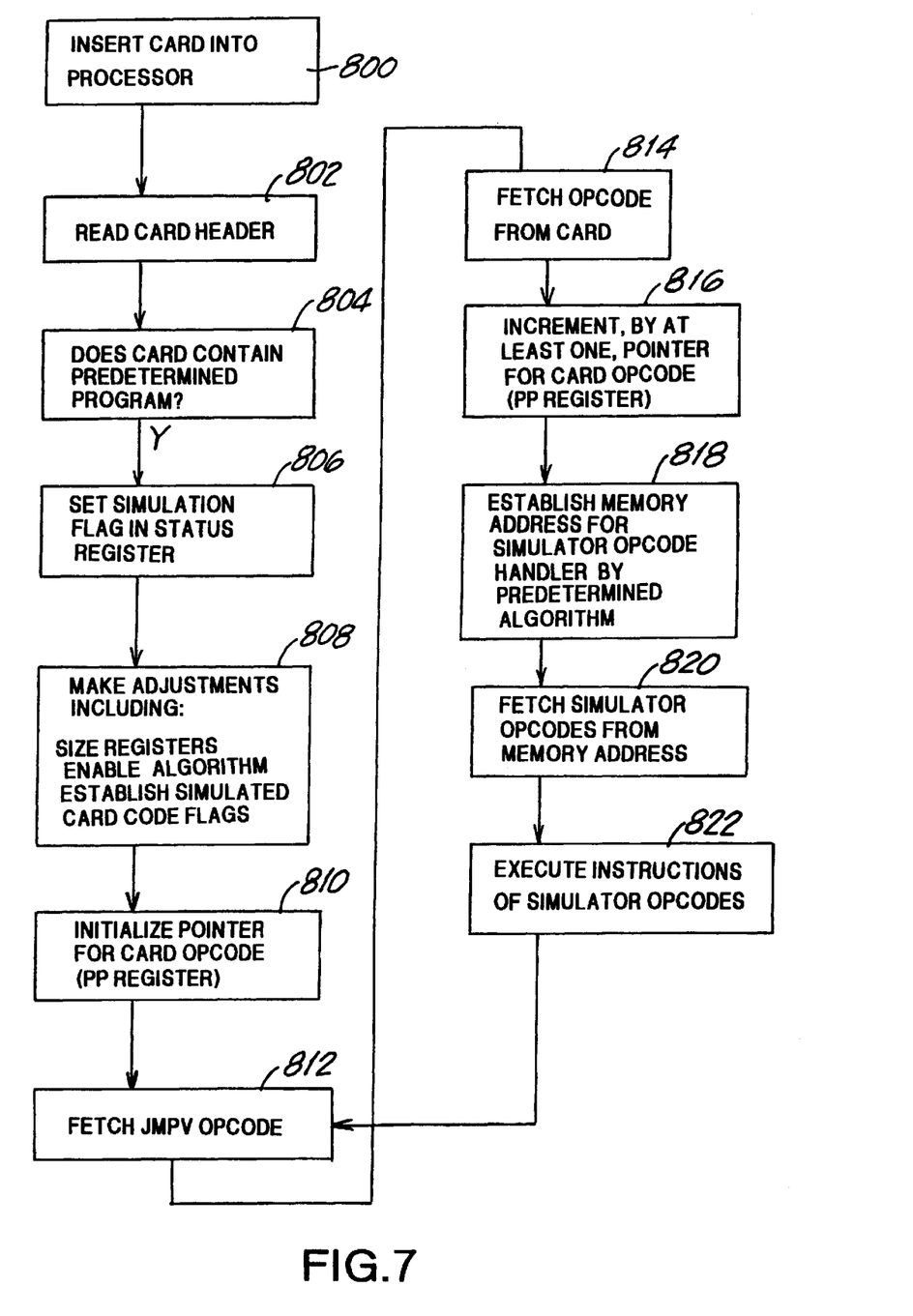
FIG. 7 is a simplified flow chart illustrating a technique for executing a target program designed for a first instruction set on a host processor designed for a second instruction set different from the first instruction set.

In summary terms, FIGS. 5, 6 and 7 are flow charts or sequence charts that summarize the main features described in detail above.

FIG. 5 relates to the employment of a dual function opcode in order to extend a number of opcode functions for a fixed number of opcode designations. As indicated at function 600, an opcode is fetched and then as shown at 602, a determination is made as to whether or not the opcode is a setting opcode. If it is not, then as shown at function 604, the opcode is executed and the resolving flag is cleared. As shown at 605, the next opcode can be fetched and a determination is then made at 606 as to whether or not that next opcode is a dual function opcode. If it is not a dual function opcode, then as shown at 608 it is executed. If it is a dual function opcode, then as shown at 610, the first of the two functions are executed because the resolving flag has been cleared. However, if at function 602, the fetched opcode is a setting opcode then as shown at 612 that setting opcode is executed and, because it is a setting opcode, the resolving flag is forced into its set state. As shown at 614, the next opcode fetched is a dual function opcode. It is a dual function opcode because of the program requirement which is that a setting opcode is always followed by a dual function opcode. As shown at 616, because this is a dual function opcode and the setting flag is at said set state, the second function of the dual function opcode is executed and the resolving flag is cleared.

FIG. 6 illustrates the sequence of functions in connection with the push and pop arrangement that also serves to increase the number of opcode functions that can be performed with a limited set of opcodes. As illustrated in FIG. 6, at step 700, an opcode is fetched. As shown at 702, a determination has to be made as to whether this is a generic push opcode or a generic pop opcode. If it is a push opcode, then the stack pointer is decremented 704 and the data from the register that is currently pointed to by the register pointer is copied into the stack as shown at 706. The register pointer then is increased by one as shown at 708 so that the next push opcode can go through the same series of steps. This can be done without the push opcode carrying any register designation. Accordingly, one generic push opcode can perform a series of push functions.

Similarly if the opcode fetched at 700 is determined at 702 to be a generic pop opcode, then at 710 data is copied from the stack to the register; that register being the one currently pointed to by the register pointer. After the data has been copied, as shown at 712, the stack pointer is automatically incremented by one and the register pointer is automatically decremented by one. This places the stack and register pointers in appropriate positions so that if the next opcode fetched is a generic pop opcode the copying procedure can continue using the generic pop opcode until a series of data transfers from stack to register has been completed.

FIG. 7 illustrates the simulation sequence. As shown therein when a card has been inserted into a processor 800, the card header has to be read at 802 to determine at 804 if this card has a predetermined program appropriate for this simulation technique. If it does, then as shown at 806, the simulation flag has to be set in the status register. As shown at 808, a series of adjustments are automatically made including appropriate sizing of registers that are required for the enabling of the algorithm that is involved and establishing of simulated card code flags. As shown at 810, the pointer for the card opcode is initialized and then at 812, the jump vector (JMPV) opcode is fetched. This jump vector opcode is the key simulator opcode. It is executed to perform the functions of fetching a target opcode from the card at 814; incrementing the pointer for the card opcode 816 and applying the algorithm enabled at step 808 to the opcode fetched from the card so as to establish the memory address for the handler opcode at step 818. Then at step 820, the handler opcode is fetched from the memory address established at step 818 and is executed at step 822 to perform all or part of the function of the opcode that was fetched from the card at step 814.

It has to be kept in mind that a plurality of handler opcodes will normally have to be fetched from the memory address to perform the target opcode functions. They are fetched from a plurality of normally sequential memory addresses which are automatically addressed until the two or three or more that have to be fetched are all executed in order to perform the complete function of the target opcode on the card. The last of the opcodes fetched from the group of memory addresses is another jump vector opcode so that the procedure starting with fetching the next opcode from the card (step 814) can occur until the card program has been executed.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A processor for executing a computer program stored as a plurality of opcodes in a digital memory, comprising:

a set of dual function opcodes, each of said dual function opcodes having a first function and a second function, a setting opcode, and a resolving flag having a set state and a clear state, means for fetching of said setting opcode; said fetching forcing said resolving flag into said set state, means for fetching of any one of said dual function opcodes, when said resolving flag is in said set state, resulting in the execution of said second function by said processor, means for fetching of any one of said dual function opcodes, when said resolving flag is in said clear state, resulting in the execution of said first function by said processor, said setting opcode being fetched immediately prior to the fetching of one of said dual function opcodes for execution of said second function thereof.

2. The processor of claim 1 wherein:

the execution of said second function of said dual function opcode forces said resolving flag into said clear state.

3. The processor of claim 1 wherein:

said setting opcode performs a program operation in addition to forcing said resolving flag into said set state.

4. The processor of claim 3 wherein:

a program operation of the setting opcode fetched is always executed prior to the second function of the associated one of said dual function opcodes.

5. The method of executing a computer program stored as a plurality of opcodes in a digital memory, comprising the steps of:

providing a set of dual function opcodes, each of said dual function opcodes having a first function and a second function, fetching a setting opcode, executing said setting opcode, forcing a resolving flag into a set state in response to said step of executing said setting opcode, immediately thereafter, fetching an associated one of said dual function opcodes, in response to said set state of said resolving flag, executing said second function of said dual function opcode, and clearing said resolving flag.

6. The method of claim 5 further comprising the steps of:

fetching one of said dual function opcodes after said steps of clearing said resolving flag, and executing said first function of said dual function opcode, whereby the state of said setting opcode determines which of the functions of said dual function opcodes is executed.

7. The method of claim 5 wherein said step of executing said setting opcode includes performing a program operation determined by said setting opcode in addition to said step of forcing.

\* \* \* \* \*